US012724796B2

(12) United States Patent
Tong et al.

(10) Patent No.: US 12,724,796 B2
(45) Date of Patent: Sep. 1, 2026

(54) CATEGORIZATION OF TRANSACTIONS USING THIRD-PARTY DATA

(71) Applicant: Apple Inc., Cupertino, CA (US)

(72) Inventors: Jon Tong, London (GB); George Walker, London (GB); Andrei P. Makhanov, Orinda, CA (US); Derek Farmer, Seattle, WA (US); Kieran O'Sullivan, London (GB); Marco Paneghel, London (GB); Mark Schubel, Redwood City, CA (US); Saurabh V. Pendse, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/795,935

(22) Filed: Aug. 6, 2024

(65) Prior Publication Data

US 2025/0139130 A1 May 1, 2025

Related U.S. Application Data

(60) Provisional application No. 63/546,482, filed on Oct. 30, 2023.

(51) Int. Cl.

*G06F 16/28* (2019.01)
*G06F 16/25* (2019.01)
*H04W 4/029* (2018.01)

(52) U.S. Cl.

CPC .......... *G06F 16/285* (2019.01); *G06F 16/258* (2019.01); *H04W 4/029* (2018.02)

(58) Field of Classification Search

CPC .. G06F 16/285; G06F 16/258; G06F 16/1794; H04W 4/029
USPC .......................................................... 707/724
See application file for complete search history.

(56) References Cited

U.S. PATENT DOCUMENTS

| | | | | |
|---|---|---|---|---|
| 6,216,137 | B1 * | 4/2001 | Nguyen | G06F 16/213 707/999.203 |
| 2017/0116599 | A1 * | 4/2017 | Gupta | G06Q 30/02 |
| 2018/0059252 | A1 * | 3/2018 | Miura | G01S 19/42 |

* cited by examiner

*Primary Examiner* — Tony Mahmoudi
(74) *Attorney, Agent, or Firm* — Kilpatrick Townsend & Stockton LLP

(57) ABSTRACT

A method may include receiving information associated with a transmission of data. The method may include determining a classification for the information associated with the transmission of data. Based on the classification and in response to a trigger, the method may include formatting a portion of the information into a first schema associated with a location service. The method may also include transmitting a request for location information corresponding to the portion of the information to the location service according to the first schema. The method may include receiving, from the location service, the location information according to the first schema and formatting the location information from the first schema to a second schema associated with the computing device. The method may include updating the information associated with the transmission of data to include the location information.

17 Claims, 9 Drawing Sheets

CATEGORIZATION OF TRANSACTIONS USING THIRD-PARTY DATA

CROSS-REFERENCES TO OTHER APPLICATIONS

This application claims priority to U.S. Provisional Application No. 63/546,482, for "CATEGORIZATION OF TRANSACTIONS USING THIRD-PARTY DATA," filed on Oct. 30, 2023, which is herein incorporated by reference in its entirety for all purposes.

BACKGROUND

Metadata associated with data transfers may include several pieces of information that could be useful in determining particular characteristics about the parties involved in the data transfers. However, with the wide variety of data transfers, not all metadata associated with each data transfer may include the same information. The lack of some information may present difficulties in using the metadata later.

SUMMARY

A method of classifying data may include receiving, by a computing device, information associated with a transmission of data. The method may include determining, by the computing device, a classification for the information associated with the transmission of data. Based at least in part on the classification and in response to a trigger, the method may include formatting, by the computing device, at least a portion of the information into a first schema associated with a location service. The method may also include transmitting, by the computing device, a request for location information corresponding to the portion of the information to the location service according to the first schema. The method may include receiving, by the computing device and from the location service, the location information according to the first schema. The method may include formatting, by the computing device, the location information from the first schema to a second schema associated with the computing device. The method may include updating, by the computing device, the information associated with the transmission of data to include the location information.

A system may include one or more processors and a non-transitory computer-readable medium including instructions that, when executed by the one or more processors, cause the system to perform operations. According to the operations, the system may receive, by a computing device, information associated with a transmission of data. The system may determine, by the computing device, a classification for the information associated with the transmission of data. Based at least in part on the classification and in response to a trigger, The system may format, by the computing device, at least a portion of the information into a first schema associated with a location service. The system may transmit, by the computing device, a request for location information corresponding to the portion of the information to the location service according to the first schema. The system may receive, by the computing device and from the location service, the location information according to the first schema. The system may format, by the computing device, the location information from the first schema to a second schema associated with the computing device. The system may update, by the computing device, the information associated with the transmission of data to include the location information.

A non-transitory computer-readable medium may include instructions that, when executed by one or more processors, cause a system to perform operations. The operations may include receiving, by a computing device, information associated with a transmission of data. The operations may include determining, by the computing device, a classification for the information associated with the transmission of data. Based at least in part on the classification and in response to a trigger, the operations may include formatting, by the computing device, at least a portion of the information into a first schema associated with a location service. The operations may include transmitting, by the computing device, a request for location information corresponding to the portion of the information to the location service according to the first schema. The operations may include receiving, by the computing device and from the location service, the location information according to the first schema. The operations may include formatting, by the computing device, the location information from the first schema to a second schema associated with the computing device. The operations may include updating, by the computing device, the information associated with the transmission of data to include the location information.

DETAILED DESCRIPTION

Figure 1:
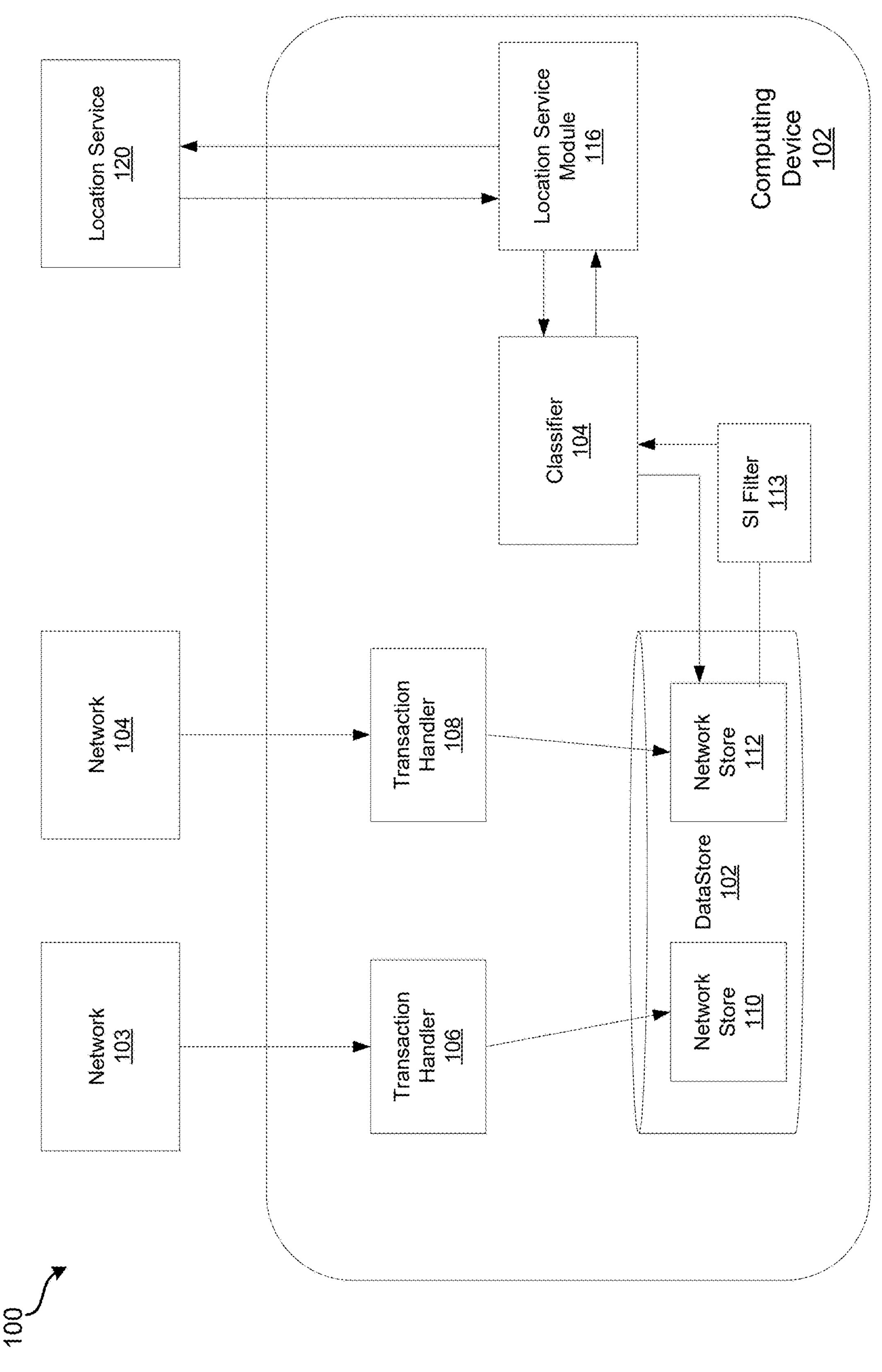
FIG. 1 illustrates a system for categorizing transactions, according to certain embodiments.

The transfer of electronic data pervades interactions between people, businesses, governments, and other entities. In fact, more and more interactions that were governed largely by people, pen, and paper are now being completed with electronic data transfer instead. The use of electronic data to complete these interactions provides opportunities to collect and correlate the electronic data and make inferences regarding the various interactions that generated the data in the first place. Furthermore, data collected regarding one interaction may be able to assist in determining some other data about another interaction.

One complicating factor in the correlation of this electronic data may be the multiple sources of data for a particular type of interaction. For example, individual transactions now may be associated with several data sources (or "sources of truth"). Before the invent of automated teller machine (ATM) cards, cash and checks were used to complete most transactions, making banks effectively the sole source of truth in transactions. Then, credit cards started entering the market. While many banks issued credit cards (and thus remained a significant source of truth), other financial institutions became involved in transactions.

More and more, however, transactions are being completed electronically, with a variety of payment sources being used. Many of these payment sources are contact-less, with no paper receipt or other method of tracking certain information about the transaction (e.g., third party processors, native e-wallets, cryptocurrency, online purchasing, etc.). In effect then, many transactions have become data transfer between an individual and another entity. There may also now be many sources of truth for a single transaction, not to mention the number of sources of truth that may be involved in all transactions (or data transfers).

Despite the (sometimes often) disparate sources of information regarding data transfers (e.g., transactions), it may be desirable to correlate data associated with specific data transfers. However, because the data transfers may be associated with disparate sources, various information included about various data transfers may not all include the same types of information. Furthermore, the various information may not be formatted in a way that makes even storing and referencing the various information efficient or even possible. For example, a user may complete a particular data transfer via an e-wallet. The e-wallet may provide a record associated with the particular data transfer that includes information such as a time, an amount, a status, a location, etc. The same user may complete another data transfer via some other method (e.g., a debit card). A record of the data transfer may identify the amount and status, but not the location. Furthermore, the two records may be in incompatible formats, making correlating and using the two records together difficult or impossible. Thus, to obtain a complete record of the data transfer with the all of the pertinent information, it may first be necessary to transfer all or some of the data transfer records from whatever format (or "schema") the records are originally in to a common schema. Then, where possible, the records of the data transfer may be correlated and any missing information (e.g., location information) requested. Once the records have been updated with completed information, the records of the data transfer may be used to infer and/or determine one or more other datum associated with the user and/or another entity involved in the data transfer.

One solution to these problems may be to receive, by a computing device, information associated with a data transfer (either the reception or transmission of data). The information may be from a particular data source. Depending on the data source, the information may be parsed by a transaction handler associated with the data source. For example, irrelevant or redundant data within the information may be removed, and the remaining information may be formatted into a schema for storage by the computing device (e.g., in a data store). The information associated with the data transfer may then be correlated with information associated with another data transfer. For example, the computing device may receive first information from a first data source and second information from a second data source. The first and second information may share some data that indicates that the two data transfers are related in some way (e.g., time, place, etc.). It could be that the two data transfers are actually the same data transfer, and the first and second information include the same data. In other examples, the first and second information may represent two data transfers that occurred close in time. The second information may not include some data, however.

Then, the computing device may classify the second information. For example, the computing device may determine that the second information indicates that the second data transfer involved a transmission of data from a user to an entity (instead of person to person, a reception of data, etc.). The computing device may then format at least a portion of the second information into a schema desired to request the missing data, such as location information. Then, the computing device may transmit the request for the location information to a location service and receive the location information associated with the second data transfer. The second information can then be updated to include the location information (or other missing data) and stored in the datastore. Thus, information associated with data transfers may be correlated and "back filled" with missing information. The completed records of the data transfers may then be used to provide better tracking of the various data transfers, as well as to determine other information about the various entities involved in the data transfers. The systems and methods described herein may therefore allow for the more efficient operation of the computing device when tracking data transfers, as well as to provide more accurate information to all users based on the data transfers associated with the user.

One example of a data transfer may be a transaction, where a user purchases an item, transfers funds, receives funds etc. Although some of the figures and descriptions discuss transactions, it should be understood that the systems and methods described herein may have broad applicability to any type of data transfer (e.g., file transfers, contact sharing, etc.). Thus, the descriptions involving transactions are merely examples made for clarity and are in no way limiting.

FIG. 1 illustrates a system 100 for categorizing transactions, according to certain embodiments. The system 100 may include a computing device 102, a network 103, a network 104, and a location service 120. The computing device 102 may include transaction handlers 106 and 108 and a datastore 109. The datastore 109 may include network store 110 and network store 112. The computing device 102 may also include a sensitive information (SI) filter 113 and a classifier 114 and a location service module 116, configured to communicate with the location service 120. The computing device 102 may be a mobile device such as a smart phone, tablet, laptop computer, or other such device. The computing device 102 may be associated with a user and include one or more identifiers and/or cryptographic signatures or hashes unique to the user. Thus, the datastore 109 may only include information associated with the user.

The transaction handler 106 may be configured to receive and parse data from the network 103. For example, the network 103 may be a network associated with a manufacturer of the computing device 102. As such, any information associated with a transmission of data (e.g., a transaction) may include data desired by the user and/or the manufacturer. The transaction handler 106 may then parse the information for any duplicate or irrelevant data. In some embodiments, the transaction handler 106 may format the information from the network 103 into a schema requested by the datastore 109 and store the data store in the network store 110 of the datastore 109. The network store 110 may therefore only include information about transactions made via the network 103.

The transaction handler 108 may be configured to receive and parse data from the network 104. Unlike the network 103, the network 104 may represent multiple entities, such as banks. As such, information received from the network 104 may not be homogenous; the information may include different data in a different format even as compared to other information received from the network 104. Therefore, the transaction handler 108 may parse the information received from the network 104 to identify exactly what data is included (and missing) from the information. The transaction handler 108 may then reformat the information from the network 104 into the schema requested by the datastore 109 and store the information in the network store 112.

In some embodiments, the information from the network 103 and the network 104 may be associated with the same transaction (or data transfer). For example, the network 103 may represent an e-wallet associated with the manufacturer of the computing device. A bank account, debit card, etc. associated with the network 104 may be used by the e-wallet. Thus, when a purchase is made via the e-wallet (i.e. the network 103), the purchase may also be reflected in the network 104. Information associated with the transaction may be generated through the network 103 and transmitted to the computing device 102 via the transaction handler 106 and subsequently stored in the network store 110. Similarly, information associated with the transaction may be generated through the network 104 and transmitted to the computing device 102 via the transaction handler 108 and subsequently stored in the network store 112. Then, the computing device may correlate the information from the networks 103 and 104, determining that the information is associated with the same transaction (e.g., identical time, transaction ID, etc.). Any missing data may therefore be "filled in" by the corresponding data from the other network.

In other embodiments, the information from the network 103 may be related to a first transaction and the information from the network 104 may be related to a second transaction. Information associated with the first transaction may include some or all of the data needed by the computing device (e.g., time, transaction ID, merchant name, location, etc.). Information associated with the second transaction may be missing some data, such as the location data. For example, the information for may include data indicating the merchant and the time, but not the location information. Thus, the first and second transactions may not be correlated as being the same transaction.

The SI filter 113 may be configured to identify any sensitive information included in the from information associated the transaction. The SI filter 113 may be configured to identify patterns and/or other characteristics in data strings that correspond to sensitive information. Upon identifying sensitive information, the SI filter 113 may redact the sensitive information before transmitting the transaction information to the classifier 114. For example, the SI filter 113 may determine that a string containing an "@" followed by a domain name corresponds to an email address (e.g., jim@emailaddress.com). In another example, the SI filter 113 may determine that a 10-digit string of numbers may represent a bank account number. In yet another example, the SI filter 113 may determine that a 12-digit string of numbers with a particular prefix indicates a credit card number. In some embodiments, the SI filter 113 may be configured to identify sensitive information based on the characteristics of the user. For example, the user may be based in the United States. The SI filter 113 may therefore determine that a 9-digit string of numbers corresponds to a social security number. A similar SI filter associated with a second user from a different country may not recognize a 9-digit number as a social security number, and therefore not filter the 9-digit number.

The classifier 114 may filter information from the network store 112. For example, information may be provided from the network store 112 (and/or the datastore 109 and the network store 110) that includes outgoing transactions (payments), incoming transactions (credits), transactions between two different users (P2P payments), etc. The classifier 114 may then classify the information associated with each transaction based on the transaction type and the direction of the transaction. The classifier 114 may then pass on some or all of the information to the location service module 116, along with the unique ID and/or hash associated with the user of the computing device. Thus, the information passed to the location service module 116 may be encrypted and remain private to the user and/or the computing device 102. The location service module 116 may then reformat the information to schema necessary to issue a request for location information from the location service 120 and transmit the request for location information to the location service 120. The location service 120 may use the information to determine a location of the merchant, although none was provided in the information. The location service 120 may also update other date based on the information provided via the location services module 116 (e.g., business hours of a merchant, a DBA name, etc.).

In some embodiments, the computing device 102 may provide information associated with the first transaction as well as the second transaction. The location service 120 may utilize at least some of the information associated with the first transaction to determine the location of the second transaction. For example, according to the provided information, the first transaction may have occurred at a first time at a first location. The second transaction may have occurred at a second time, close in time to the first transaction (e.g., 10 minutes). The location service 120 may then determine a merchant name associated with the second transaction based on the information provided. The location service 120 may then determine that a merchant of the same or similar name is located within a proximity reasonably accessible in the time between the first and second transactions. The location service 120 may then determine that the second transaction likely occurred at a second location, and return location information indicating the second location to the computing device 102. The computing device 102 may then reformat the location information according to the schema requested by the datastore 109 and update the information in the network store 112 accordingly.

Figure 2:
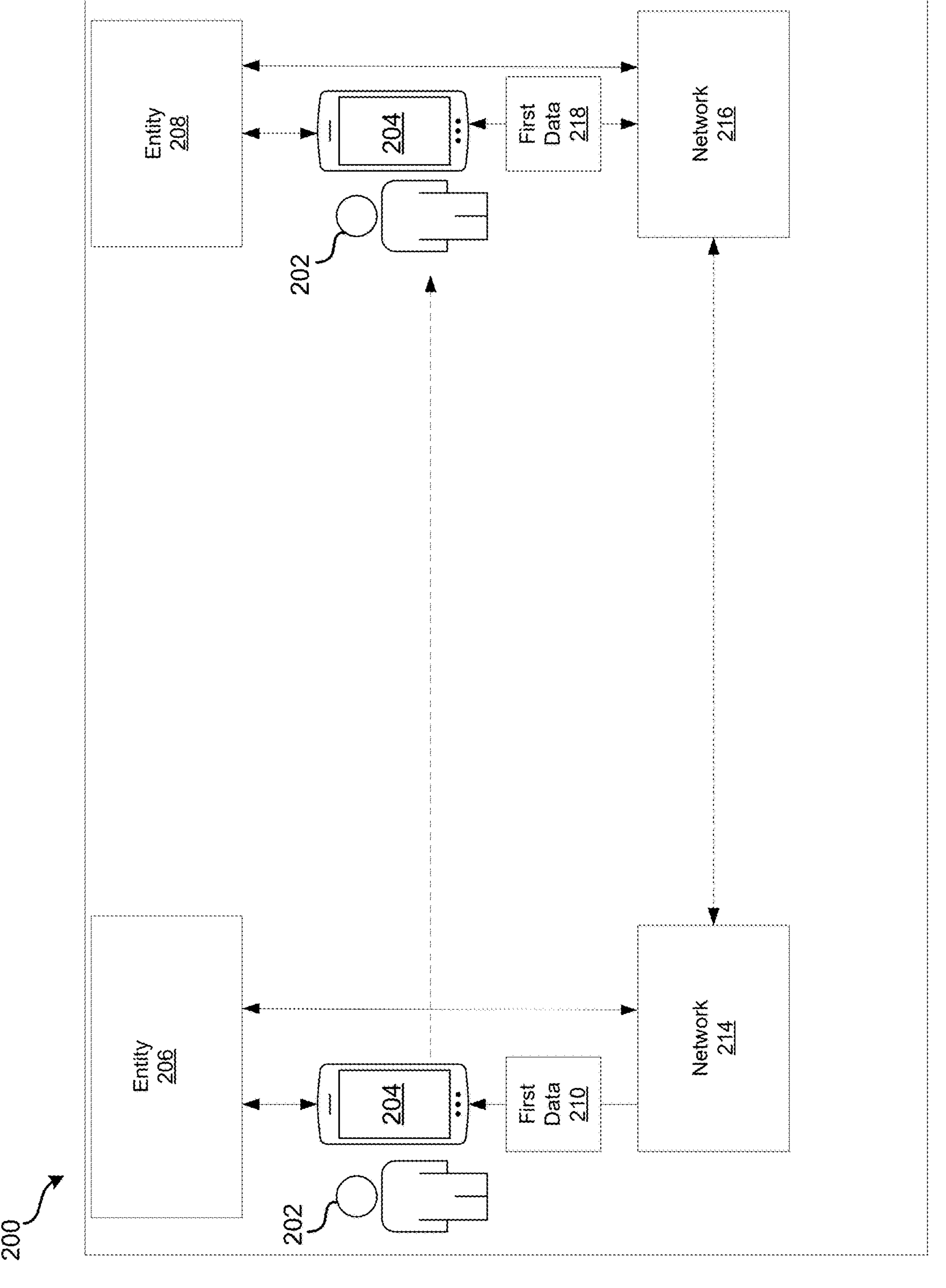
FIG. 2 illustrate a user and two merchants, according to certain embodiments.

FIG. 2 illustrate a user 202 and two entities 206 and 208, according to certain embodiments. The user 202 may be associated with a mobile device 204 (e.g., the computing device 102 in FIG. 1). The user 202 may make a first transaction (e.g., a data transmission) with the entity 206 at a first time. In an example, the entity 206 may be a merchant or other entity for data transfers. The mobile device 204 may initiate a data transfer associated with the entity 206 via an e-wallet or similar method. During the transaction, the entity 206 may contact a network 214 (e.g., a payment system) to verify one or more components of the transaction (e.g., account balances, identification, authentication, etc.). The network 214 may in turn communicate with the entity 206, providing payment information and/or other data necessary to complete the transaction. The network 214 may then provide first data 210 to the mobile device 204. The first data 210 may include a first transaction ID associated with the first transaction, location information, a time stamp, and other such information.

At a later point, the user 202 may make a second transaction with the entity 208. The entity 208 may be a banking network, credit processor, or other entity involved in data transfers. To make the second transaction, mobile device 204 may initiate a data transfer associated with the entity 208 via a bank or similar method (e.g., using a debit card, credit card, etc.). During the transaction, the entity 208 may contact a network 216 to verify one or more components of the transaction (e.g., account balances, identification, authentication, etc.). The network 216 may in turn communicate with the entity 208, providing payment information and other data necessary to complete the transaction. The network 216 may then provide second data 218 to the mobile device 204. The second data 218 may include a second transaction ID associated with the second transaction, a time stamp, and other such information, but not the location information associated with the second transaction. Both the first data 210 and second data 218 may be stored in respective datastores of the mobile device 204, such as the network stores 110 and 112 in FIG. 1. As such, the first data 210 and the second data 218 may be reformatted into a schema native to the mobile device 204. The first and second data 210 and 218 may be at least partially correlated (e.g., because the transactions were temporally close), or uncorrelated.

FIGS. 3A-E illustrate a system 300 for categorizing information associated with a data transfer, according to certain embodiments. The system 300 may be similar to the system 100 in FIG. 1 and/or perform similar functions to the mobile device 204 in FIG. 2. The system 300 may include the computing device 301. The computing device 301 may be similar to the computing device 102 and/or the mobile device 204. The computing device 301 may include a datastore 302 and a classifier 304. The datastore 302 may be similar to the datastore 109 in FIG. 1. Although not shown, the datastore 302 may include one or more network stores (e.g., the network stores 110-112), where each network store includes information associated with information from a particular data source (e.g., the network 214 and/or the network 216). Collectively, the network stores 110 and 112 may include the data 305 (and is this shown in the datastore 302). The data 305 may include outgoing data 306 (e.g., payment transactions), incoming data 308 (e.g., credited transactions), and/or P2P data 310 (e.g., Venmo®, Zelle®, etc.). The data 305 may include other types of data as well.

The computing device 301 may receive a trigger 303. The trigger 303 may be an event such as a user opening a wallet application on the computing device 301. The trigger 303 may also be the detection of an ongoing transaction, a set time (e.g., 2 am) and/or a time interval, and/or other such triggers. In response to the trigger 303, the computing device 301 may include at least some of the data 305 to be transmitted from the datastore 302 to the classifier 304. For example, the datastore 302 may transmit the outgoing data 306, the incoming data 308, and the P2P data 310. The transmitted data, although shown as already classifier), may not actually be classified upon transmission to the classifier 304. The classifier 304 may therefore parse the transmitted data (e.g., the data 305) to determine the outgoing data 306, the incoming data 308, and the P2P data 310. The classifier 304 may also identify data that is associated with a specific type of transaction, such as a transaction between a person and a merchant. In some embodiments, the data 305 only includes data that is missing some information (e.g., location information). In other embodiments, the data 305 may include all transaction data.

In still other embodiments, the data 305 may only include data missing some information and other data that is correlated to the data missing information. For example, a first transaction may occur five minutes before a second transaction. The data associated with the first transaction may include location information, while the data associated with the second transaction may not include location information. Thus, the data associated with both events may be correlated (as being within some temporal threshold), and included in the data 305.

Figure 3A:
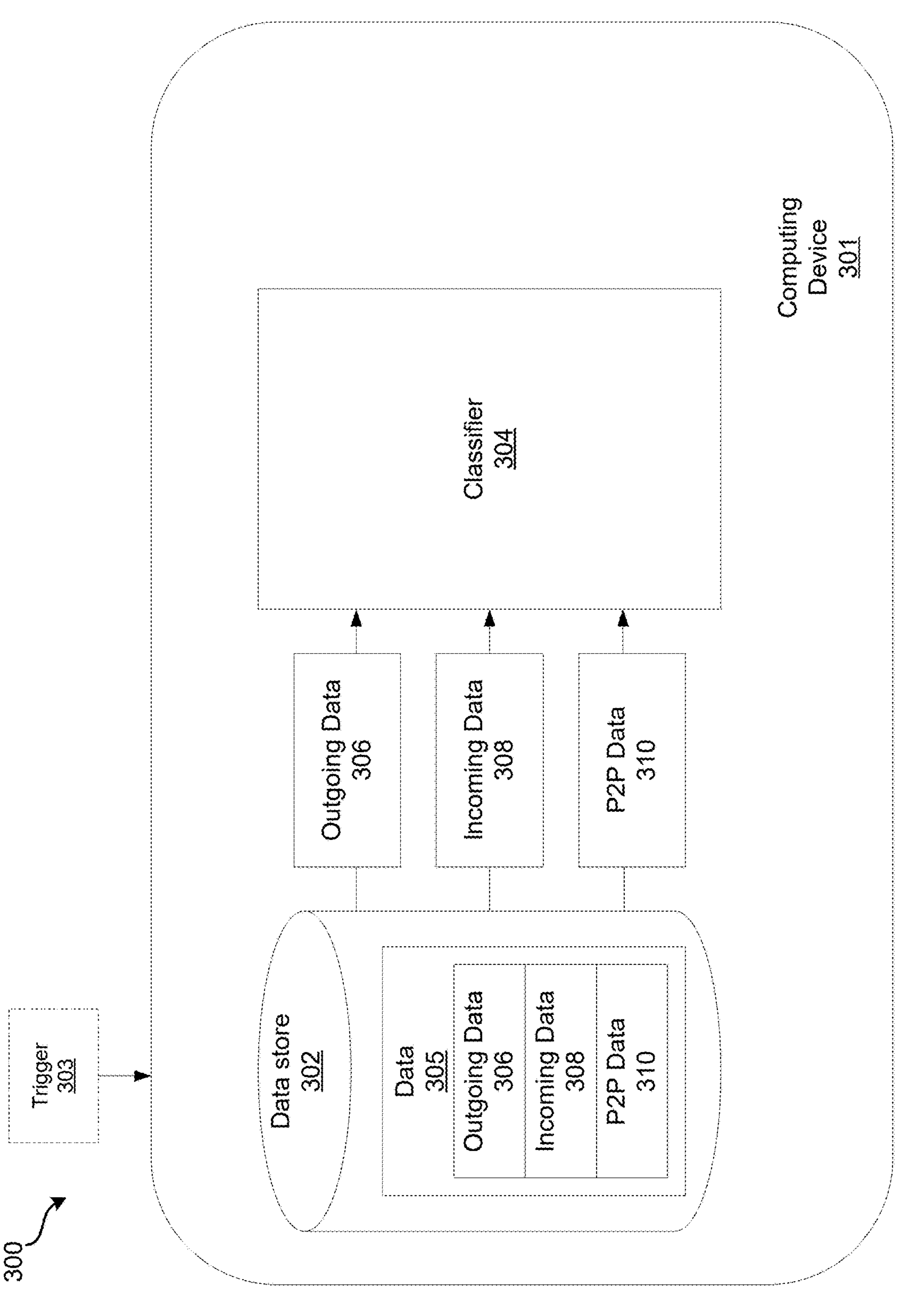
FIGS. 3A-E illustrate a system for categorizing information associated with a data transfer, according to certain embodiments.
Figure 3B:
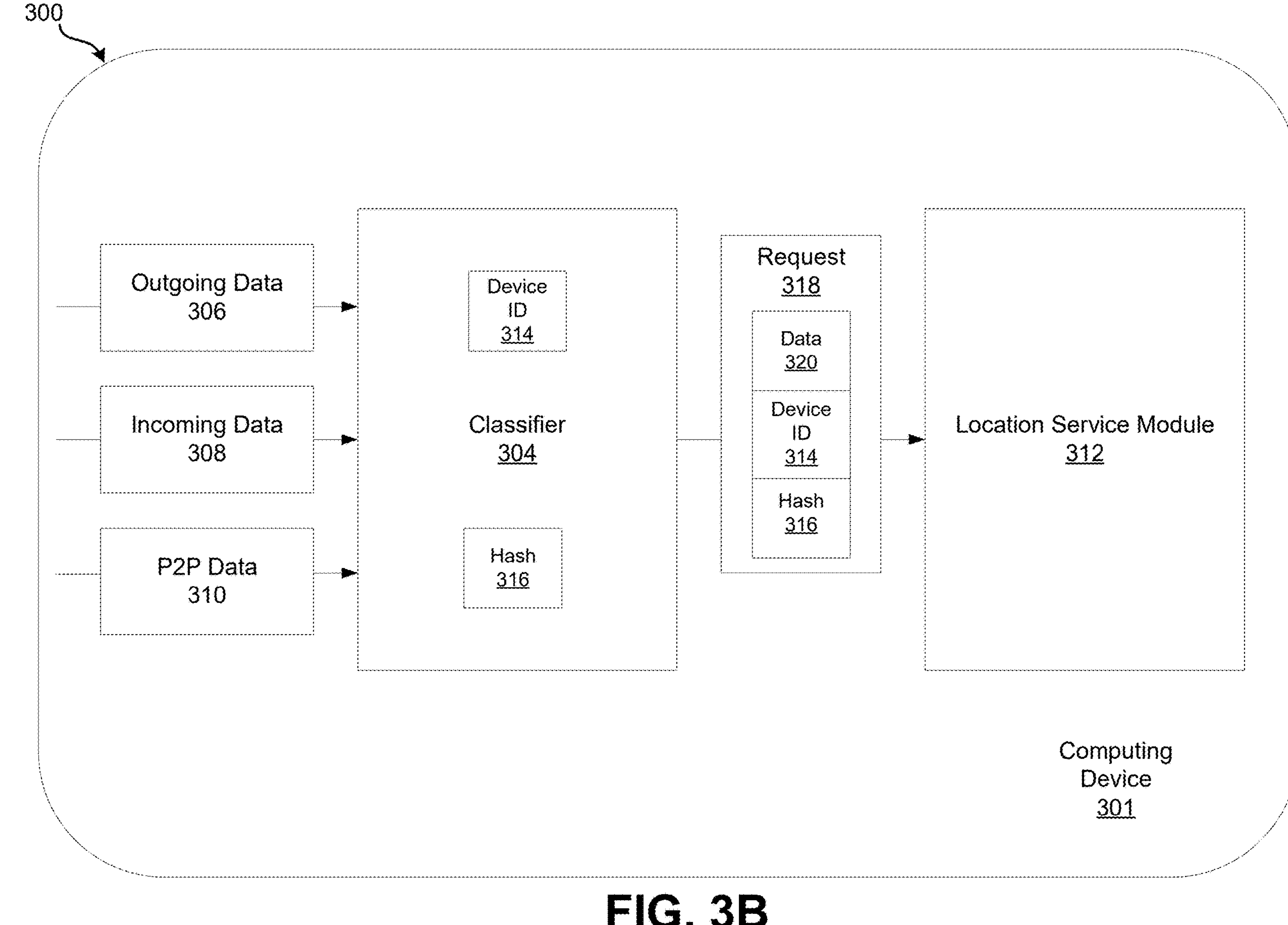

In FIG. 3B, the classifier 304 may access a device ID 314 and a hash 316. The device ID 314 may be a unique ID associated only with the user (and/or the computing device 301). The classifier 304 may utilize the device ID 314 and/or the hash 316 to encrypt a portion of the data 305 to create the data 320. Thus, the data 320 may be encrypted and uniquely associated with the user. Therefore, any personal data or information that may be included in the data 320 may not be accessible by anyone other than the user. The data 320 may only include some or all of the outgoing data 306 (e.g., purchase transactions) missing some information like location data and/or associated data from associated transactions.

Figure 3C:
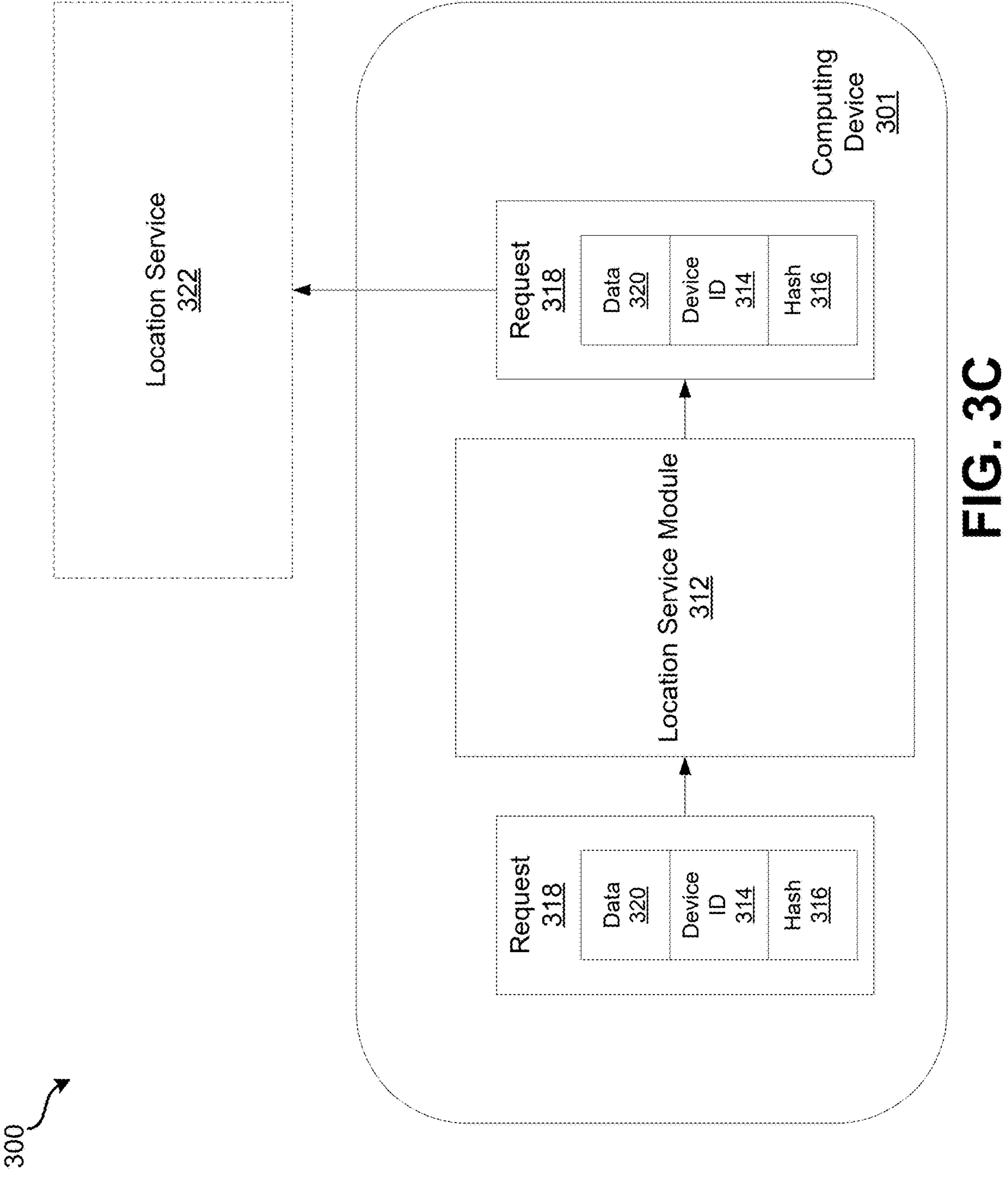

The classifier 304 may then generate a request 318 including the data 320, the device ID 314, and the hash 316. The classifier 304 may then transmit the request 138 to a location service module 312. The location service module 312 may be a module to communicate with a location service 322 to provide location information to the computing device 301 (e.g., via a maps service, etc.). In FIG. 3C, the request 318 may be received by the location service module 312. The location service module may then reformat the request 318 to a schema desired by the location service 322. The location service module 312 may or may not perform other operations or classification of the data 320. In other words, the location service module 312 may simply format the request into the schema desired by the location service 322.

Figure 3D:
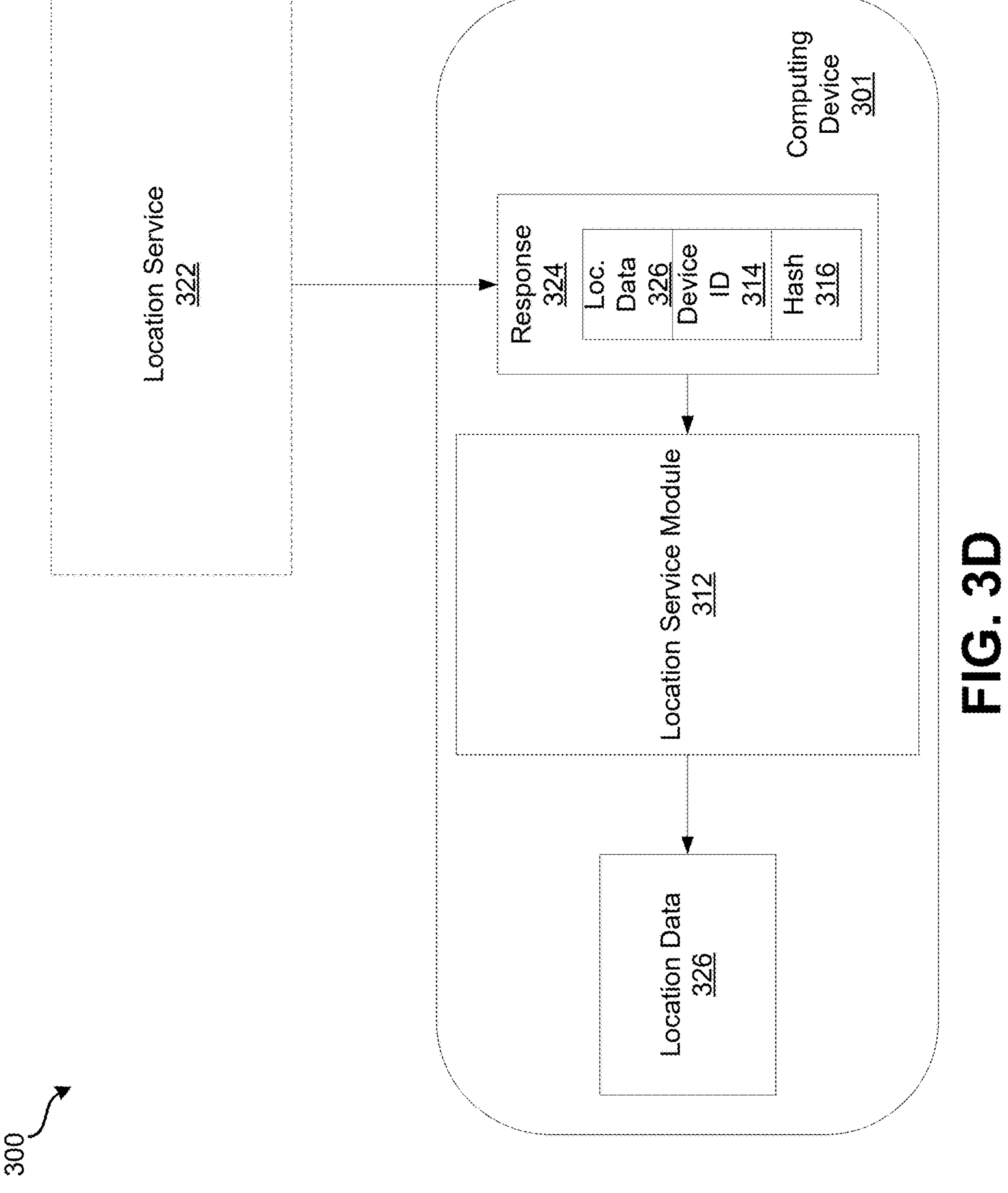

In FIG. 3D, computing device 301 may receive a response 324 from the location service 322. The response 324 may include location data associated with the data 320. For example and as in the data 305, the data 320 may include information associated with a first transaction occurring five minutes before a second transaction. The first information may include location information, while the second information may not include location information. Thus, the first and second information may therefore be correlated (as being within some temporal threshold). The location service 322 may utilize some of the first information to determine second location information associated with the second transaction. The second location information may therefore be included in the response 324 as location data 326. The response 324 may also be encrypted with or include the device ID 314 and the hash 316. Thus, if the response 324 were intercepted, no entity could read the response 324.

The response 324 may be received by the location service module 312 of the computing device 301. The location service module 312 may verify the response 324 using the device ID and/or the hash 316, then format the location data 326 to the schema requested by the datastore 302. The location data 326 may include location data for one or more transactions. The location data 326 may include location information associated with one or more transaction IDs. In other words, location information associated with respective transactions may be included in the location data 326.

Figure 3E:
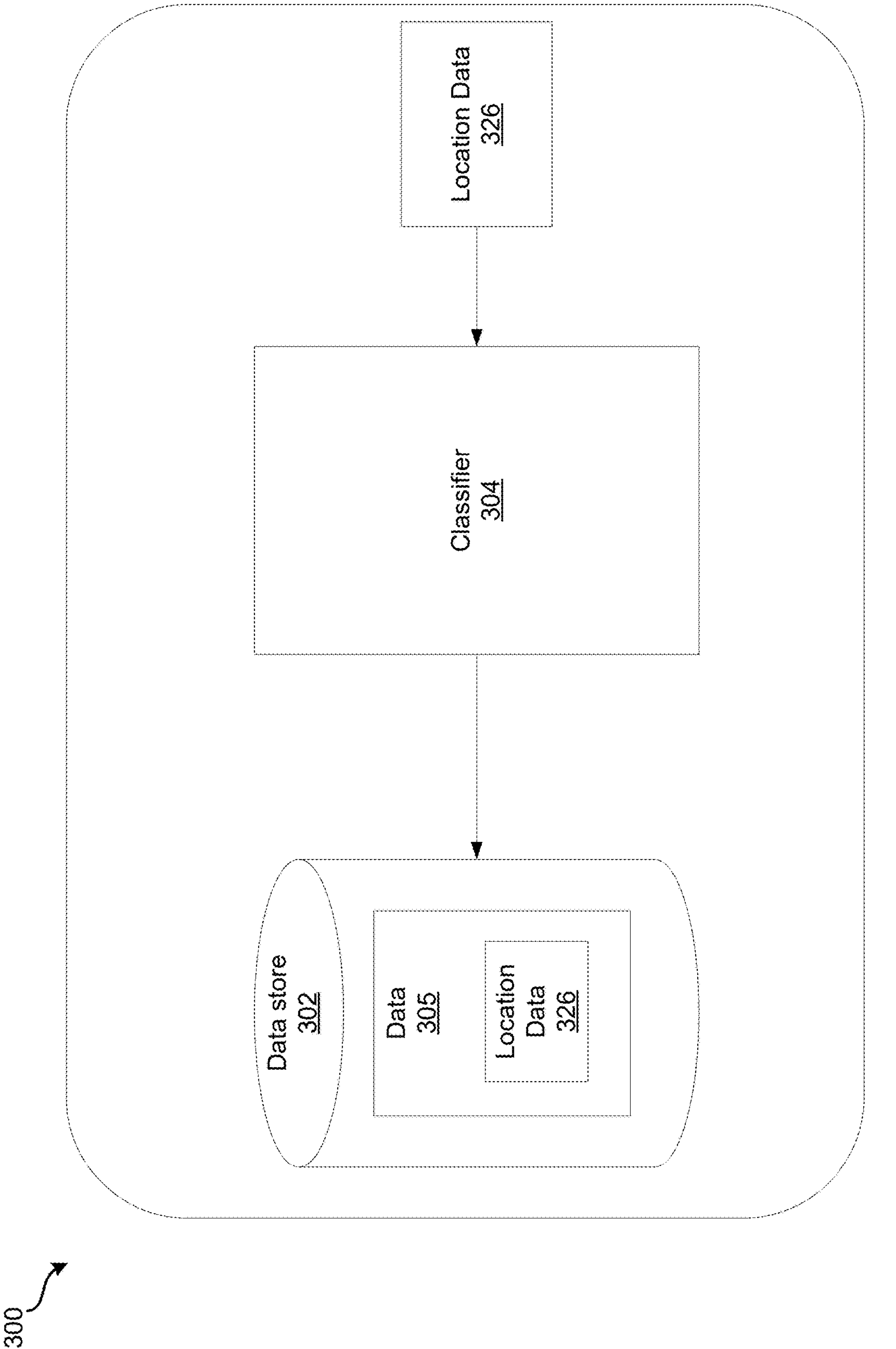

At FIG. 3E, the location data 326 may be received by the classifier 304. The classifier 304 may cause the location information included in the location data 326 to be associated with the corresponding data included in the data 305. For example, data associated with a transaction that was missing location information may be updated to include the location information in the location data 326. Returning to FIG. 1, after the location data 326 is received by the network store 112, information included in the network store may be updated to include the relevant location information. The system 100 may then re-correlate information included in the network store 110 and the network store 112, based at least in part on the location information in the location data 326.

As described above in relation to FIG. 3A, in some embodiments, the location service 322 may not fulfill some or all of the request 318. Then, the response 324 may include an error message associated with a transaction ID relating to some or all of the information in data 320. The transaction ID, the related portion of the information in the data 320, and/or the error message may be stored. Based on a trigger, the system 300 described in FIGS. 3A-3E may then reattempt to request the location information. In some embodiments, the request may be reattempted during a standard trigger (as described above). In other embodiments, the request may be reattempted after a particular time interval (e.g., every 5 seconds, every 30 seconds, every 5 minutes, etc.). In other embodiments, the error message may indicate that the request is invalid and/or can never be fulfilled. Then, the system 300 may discard the transaction and/or flag the transaction in the appropriate network store/data store.

Figure 4:
FIG. 4 illustrates a flowchart of a method for categorizing information associated with a data transfer, according to certain embodiments.
Figure 4:
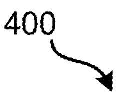
Figure 4:
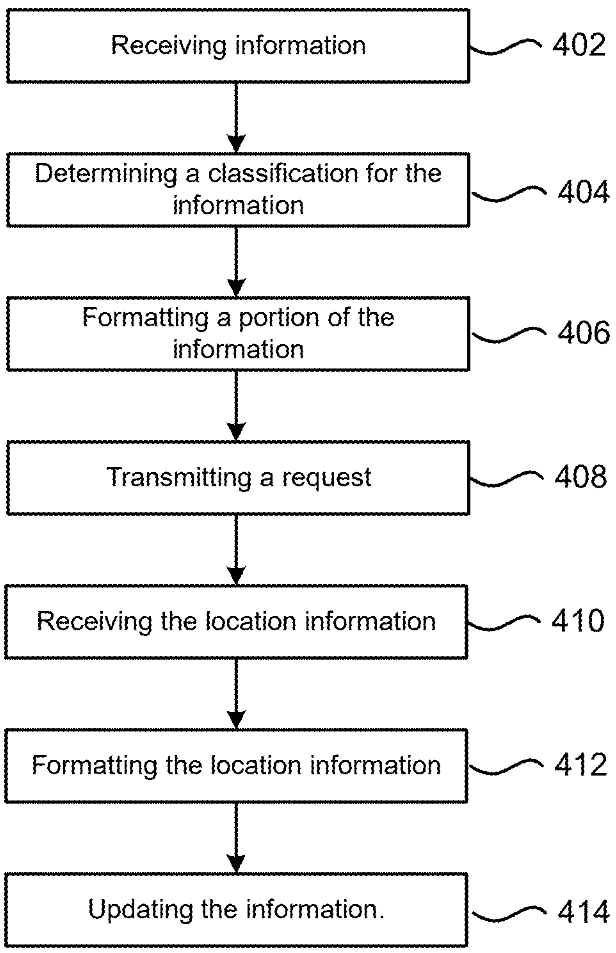

FIG. 4 illustrates a flowchart of a method 400 for categorizing information associated with a data transfer, according to certain embodiments. The method 400 may be performed by any of the systems described herein, such as the system 100 in FIG. 1 and/or the system 300 in FIG. 3. The steps of the method 400 may be performed in an order different than is described and shown in FIG. 4, and/or may be combined with other steps. In some embodiments, some of the steps may be skipped altogether.

At step 402, the method 400 may include receiving, by a computing device, information associated with a transmission of data. The transmission of data may be outgoing (e.g., a purchase), incoming (e.g., a credit), a P2P transaction, or any other data transfer. The computing device may be a mobile device, tablet, laptop, or other such device. The information associated with the transmission of data may be received from one or more networks. The one or more networks may be associated with payment methods such as e-wallets and/or banks. The information may be stored in a datastore of the computing device, such as the datastore 109.

At step 404, the method 400 may include determining a classification for the information associated with the transmission of data. The determining may be performed by a component of the computing device, such as the classifier 304 in FIG. 3A. The information may be based in part by an outgoing transmission, incoming transmission, another entity involved in the transmission, and other such factors. In some embodiments, the classification may indicate that location information is to be requested for the portion of the information.

Based at least in part on the classification and in response to a trigger, at step 406, the method 400 may include formatting, by the computing device, at least a portion of the information into a first schema associated with a location service. The portion of the information may be only outgoing data (e.g., a purchase). Furthermore, the formatting may include encrypting the portion of the information using a unique ID and/or a hash (or other code). The unique ID and/or the hash may be associated with a user of the computing device or may be associated with the transmission of data. The trigger may include least one of receiving new information, a signal indicating a user is searching for the information associated with the transmission of data (e.g., using an application such as an e-wallet), and in response to a failed attempt to receive location information. In some embodiments, the trigger may be time based, (e.g., once a day).

At step 408, the method 400 may include transmitting, by the computing device, a request for the location information corresponding to the portion of the information. The request may be transmitted to a location service according to a first schema. The first schema may be desired by the location service such as the location service 322 in FIG. 3C.

At step 410, the method 400 may include receiving, by the computing device and from the location service, the location information according to the first schema. The location information may also be encrypted with the unique ID and/or the hash. Thus, the location information may be secure from any user except the intended recipient (e.g., the computing device).

In some embodiments, the computing device may receive an error message indicating that the location information was not determined. The computing device may then store the request for the location information (e.g., in the data store 109). Then, the computing device may transmit the request for location information according to a predetermined schedule (e.g., 5 minutes, 10, minutes, etc.).

At step 412, the method 400 may include formatting, by the computing device, the location information from the first schema to a second schema. The second schema may be associated with the computing device. For example, the second schema may be associated with the data store 109 in FIG. 1. At step 414, the method 400 may include updating, by the computing device, the information associated with the transmission of data to include the location information.

In some embodiments, the computing device may receive additional information associated with a different transmission of data. The additional information may comprises additional location information. The additional location information may be related to the same transmission of data, or may be related to another transmission of data. The additional location information may then be used to determine the location information. Furthermore, the additional information may be received according to a third schema. The computing device may then format the additional information from the third schema to the second schema.

A system of one or more electronic devices can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Figure 5:
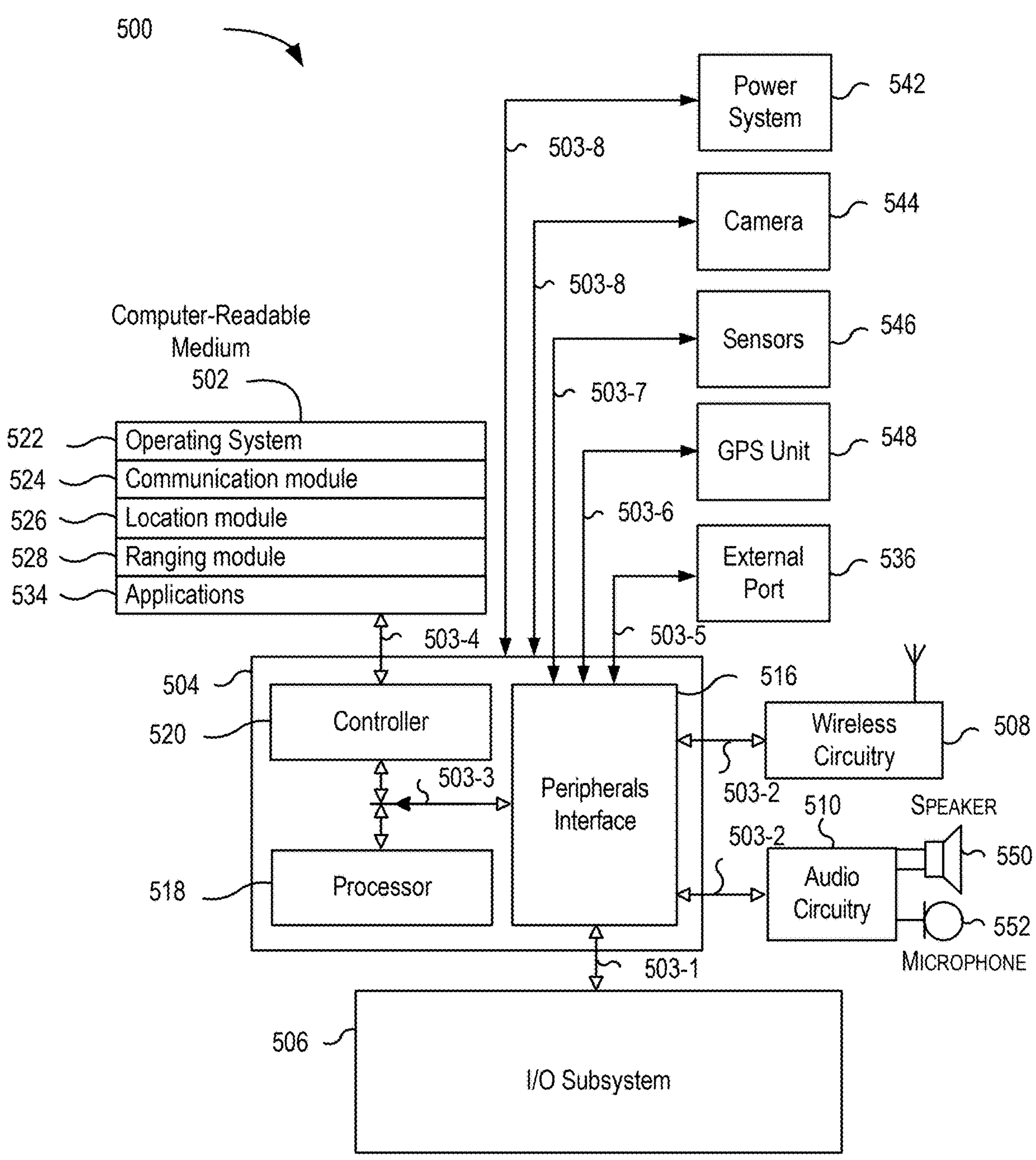
FIG. 5 is a block diagram of an example electronic device, according to some embodiments.

FIG. 5 is a block diagram of an example electronic device 500, according to some embodiments. Device 500 generally includes computer-readable medium 502, a processing system 504, an Input/Output (I/O) subsystem 506, wireless circuitry 508, and audio circuitry 510 including speaker 512 and microphone 514. These components may be coupled by one or more communication buses or signal lines 503. Device 500 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 5 is only one example of an architecture for device 500, and that device 500 can have more or fewer components than shown, or a different configuration of components. The various components shown in FIG. 5 can be implemented in hardware, software, or a combination of both hardware and software, including one or more signal processing and/or application specific integrated circuits.

Wireless circuitry 508 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 508 can use various protocols, e.g., as described herein. In various embodiments, wireless circuitry 508 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VOIP), near field communication protocol (NFC), a protocol for email, instant messaging, and/or a short message service (SMS), or any other suitable communication protocol, including communication protocols not yet developed as of the filing date of this document.

Wireless circuitry 508 is coupled to processing system 504 via peripherals interface 516. Peripherals interface 516 can include conventional components for establishing and maintaining communication between peripherals and processing system 504. Voice and data information received by wireless circuitry 508 (e.g., in speech recognition or voice command applications) is sent to one or more processors 518 via peripherals interface 516. One or more processors 518 are configurable to process various data formats for one or more application programs 534 stored on medium 502.

Peripherals interface 516 couple the input and output peripherals of device 500 to the one or more processors 518 and computer-readable medium 502. One or more processors 518 communicate with computer-readable medium 502 via a controller 520. Computer-readable medium 502 can be any device or medium that can store code and/or data for use by one or more processors 518. Computer-readable medium 502 can include a memory hierarchy, including cache, main memory and secondary memory. The memory hierarchy can be implemented using any combination of random access memory (RAM) (e.g., static random access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 516, one or more processors 518, and controller 520 can be implemented on a single chip, such as processing system 504. In some other embodiments, they can be implemented on separate chips.

Processor(s) 518 can include hardware and/or software elements that perform one or more processing functions, such as mathematical operations, logical operations, data manipulation operations, data transfer operations, controlling the reception of user input, controlling output of information to users, or the like. Processor(s) 518 can be embodied as one or more hardware processors, microprocessors, microcontrollers, field programmable gate arrays (FPGAs), application-specified integrated circuits (ASICs), or the like.

Device 500 also includes a power system 542 for powering the various hardware components. Power system 542 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 500 includes a camera 544. In some embodiments, device 500 includes sensors 546. Sensors can include accelerometers, compass, gyrometer, pressure sensors, audio sensors, light sensors, barometers, and the like. Sensors 546 can be used to sense location aspects, such as auditory or light signatures of a location.

In some embodiments, device 500 can include a GPS receiver, sometimes referred to as a GPS unit 548. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 518 run various software components stored in medium 502 to perform various functions for device 500. In some embodiments, the software components include an operating system 522, a communication module 524 (or set of instructions), a location module 526 (or set of instructions), a ranging module 528 that is used as part of ranging operation described herein, and other application programs 534 (or set of instructions).

Operating system 522 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 524 facilitates communication with other devices over one or more external ports 536 or via wireless circuitry 508 and includes various software components for handling data received from wireless circuitry 508 and/or external port 536. External port 536 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 526 can assist in determining the current position (e.g., coordinates or other geographic location identifiers) and motion of device 500. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 526 receives data from GPS unit 548 and analyzes the signals to determine the current position of the mobile device. In some embodiments, location/motion module 526 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 508 and is passed to location/motion module 526. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 500 based on the position coordinates of the corresponding transmitters. Regardless of the specific location technology used, location/motion module 526 receives information from which a location fix can be derived, interprets that information, and returns location information, such as geographic coordinates, latitude/longitude, or other location fix data Ranging module 528 can send/receive ranging messages to/from an antenna, e.g., connected to wireless circuitry 508. The messages can be used for various purposes, e.g., to identify a sending antenna of a device, determine timestamps of messages to determine a distance of mobile device 500 from another device. Ranging module 528 can exist on various processors of the device, e.g., an always-on processor (AOP), a UWB chip, and/or an application processor. For example, parts of ranging module 528 can determine a distance on an AOP, and another part of the ranging module can interact with a sharing module, e.g., to display a position of the other device on a screen in order for a user to select the other device to share a data item. Ranging module 528 can also interact with a reminder module that can provide an alert based on a distance from another mobile device.

The one or more applications 534 on device 500 can include any applications installed on the device 500, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 506 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 506 can include a display and user input devices such as a keyboard, mouse, and/or trackpad. In some embodiments, I/O subsystem 506 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 502) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 506 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 500 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of improving the integrity of data, comprising:

receiving, by a computing device, first information associated with a first transmission of data;

receiving, by the computing device, second information associated with a second transmission of data, the second information comprising associated location data;

parsing, by the computing device, the first information and the second information to identify that location information is missing from the first information;

determining, by the computing device, a classification for the first information associated with the first transmission of data;

based at least in part on the classification, the parsing, and in response to a trigger;

formatting, by the computing device, at least a portion of the first information and the second information into a first schema associated with a location service;

transmitting, by the computing device, a request for the missing location information corresponding to the portion of the first information and the second information to the location service according to the first schema;

receiving, by the computing device and from the location service, the missing location information according to the first schema, wherein the missing location information is determined based at least in part on the associated location data;

formatting, by the computing device, the missing location information from the first schema to a second schema associated with the computing device; and updating, by the computing device, the first information associated with the first transmission of data to include the missing location information.

2. The method of claim 1, wherein the request comprises a unique identifier and has code associated with the first transmission of data.

3. The method of claim 1, wherein the classification indicates that the missing location information associated with the portion of the information is to be requested.

4. The method of claim 1, wherein the second information is received in a third schema, and further comprising formatting, by the computing device, the second information from the third schema to the second schema.

5. The method of claim 1, further comprising:

receiving, by the computing device and from the location service, an error indicating that the missing location information was not determined;

storing, by the computing device, the request for the missing location information; and transmitting, by the computing device, the request for the missing location information according to a predetermined schedule.

6. The method of claim 1, wherein the trigger comprises at least one of receiving new data from a first entity, a signal indicating a user is searching for the first information associated with the first transmission of data, and in response to a failed attempt to receive location information.

7. The method of claim 1, wherein the portion of the first information associated with the transmission of data comprises an outgoing transmission of data.

8. A system for classifying data, comprising:

one or more processors; and a non-transitory computer-readable medium comprising instructions that, when executed by the one or more processors, cause the system to perform operations to:

receive, by a computing device, first information associated with a first transmission of data;

receive, by the computing device, second information associated with a second transmission of data, the second information comprising associated location data;

parse, by the computing device, the first information and the second information to identify that location information is missing from the first information;

determine, by the computing device, a classification for the first information associated with the first transmission of data;

based at least in part on the classification, the parsing, and in response to a trigger;

format, by the computing device, at least a portion of the first information and the second information into a first schema associated with a location service;

transmit, by the computing device, a request for the missing location information corresponding to the portion of the first information and the second information to the location service according to the first schema;

receive, by the computing device and from the location service, the missing location information according to the first schema, wherein the missing location information is determined based at least in part on the associated location data;

format, by the computing device, the missing location information from the first schema to a second schema associated with the computing device; and update, by the computing device, the first information associated with the first transmission of data to include the missing location information.

9. The system of claim 8, wherein the request comprises a unique identifier and has code associated with the first transmission of data.

10. The system of claim 8, wherein the classification indicates that the missing location information is to be requested.

11. The system of claim 8, wherein the second information is received in a third schema, and further comprising formatting, by the computing device, the second information from the third schema to the second schema.

12. The system of claim 8, further comprising:

receiving, by the computing device and from the location service, an error indicating that the missing location information was not determined;

storing, by the computing device, the request for the missing location information; and transmitting, by the computing device, the request for the missing location information according to a predetermined schedule.

13. The system of claim 8, wherein the trigger comprises at least one of receiving new data from a first entity, a signal indicating a user is searching for the first information associated with the transmission of data, and in response to a failed attempt to receive the missing location information.

14. The system of claim 8, wherein the portion of the first information associated with the transmission of data comprises an outgoing transmission of data.

15. A non-transitory computer-readable medium comprising instructions that, when executed by one or more processors, cause the one or more processors to perform operations comprising:

receiving, by a computing device, first information associated with a first transmission of data;

receiving, by the computing device, second information associated with a second transmission of data, the second information comprising associated location data;

parsing, by the computing device, the first information and the second information to identify that location information is missing from the first information;

determining, by the computing device, a classification for the first information associated with the first transmission of data;

based at least in part on the classification, the parsing, and in response to a trigger;

formatting, by the computing device, at least a portion of the first information and the second information into a first schema associated with a location service;

transmitting, by the computing device, a request for the missing location information corresponding to the portion of the first information and the second information to the location service according to the first schema;

receiving, by the computing device and from the location service, the missing location information according to the first schema, wherein the location information is determined based at least in part on the associated location data;

formatting, by the computing device, the missing location information from the first schema to a second schema associated with the computing device; and updating, by the computing device, the first information associated with the first transmission of data to include the missing location information.

16. The non-transitory computer-readable medium of claim 15, wherein the trigger comprises at least one of receiving new data from a first entity, a signal indicating a user is searching for the first information associated with the first transmission of data, and in response to a failed attempt to receive the missing location information.

17. The non-transitory computer-readable medium of claim 15, wherein the second information is received in a third schema, and further comprising formatting, by the computing device, the second information from the third schema to the second schema.

* * * * *